July 5, 1932.  C. G. STRANDLUND  1,865,800

CULTIVATOR

Original Filed Aug. 31, 1929

INVENTOR
Carl G. Strandlund

WITNESS
A. D. McLeay

BY
W. C. Jirdington
ATTY.

Patented July 5, 1932

1,865,800

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

CULTIVATOR

Application filed August 31, 1929, Serial No. 389,725. Renewed February 5, 1931.

My invention relates to agricultural implements and more particularly to that class employed in breaking and preparing the soil for planting, or for use in the cultivating of growing crops. My invention has for its objects the production of a frame structure adapted for the support of various earth working devices according to the nature of the work to be done, and particularly where deep plowing and cultivation are necessary. Other objects will be evident in the following specification.

Referring to the drawing in which similar numerals indicate identical parts—

Figure 1:
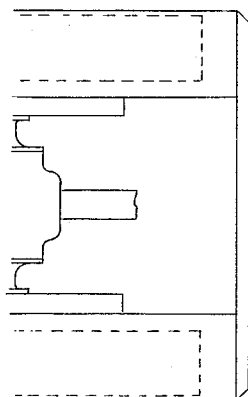
Figure 1 is a plan view of my invention showing it as attached to a tractor.
Figure 1:
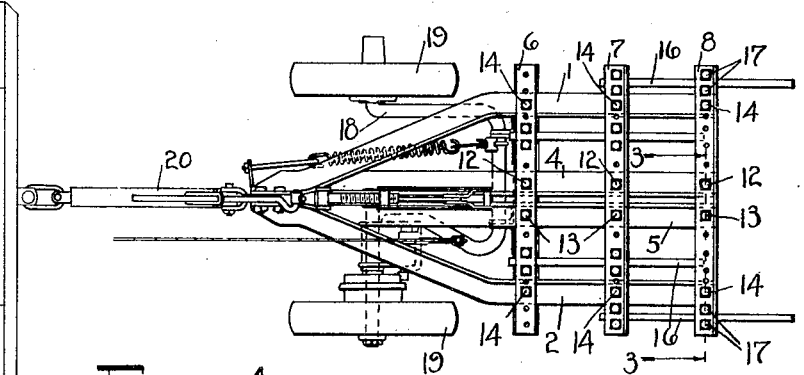
Figure 2:
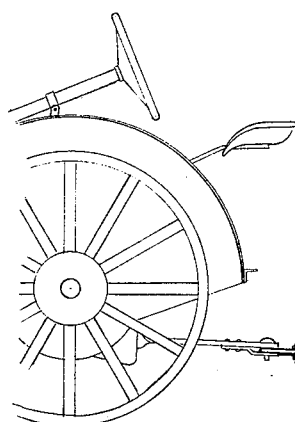
Figure 2 is a side elevation of Figure 1.
Figure 2:
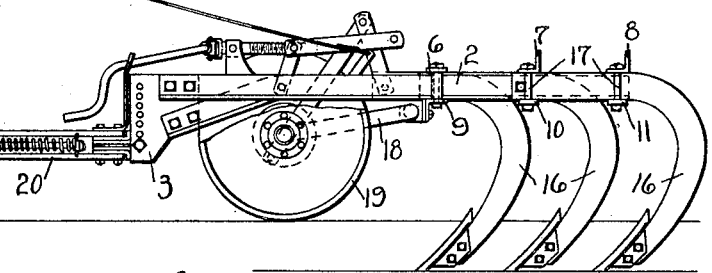

The frame is composed of angle steel side bars 1 and 2 which parallel each other for part of their length and then converge forwardly where they are rigidly bolted to a clevis 3. Central bars 4 and 5 are parallel and separated only a sufficient distance to permit fastening a tool shank between them. Forwardly the bars 4 and 5 are bent downwardly and rigidly bolted to the clevis 3 below the attachment of the side bars 1 and 2 thereto. I find this manner of attaching the frame bars to the clevis to be very advantageous in that the attachment of the side bars 1 and 2 to the upper part of the clevis and the attachment of the central bars 4 and 5 to the lower part of the clevis presents a rigid construction necessary at this point where the entire strain of operation is concentrated. Transverse bars 6, 7 and 8 extend over the bars 1, 2, 4 and 5, and bars 9, 10 and 11 extend transversely beneath the bars 1, 2, 4 and 5 and are parallel with the bars 6, 7 and 8. Bolts 12 and 13 secure the bars 6, 7 and 8 and the bars 9, 10 and 11 rigidly to the central bars 4 and 5, and bolts 14 are used for the same purpose with the side bars 1 and 2. Bars 6, 10 and 11 are flat, and bars 7, 8 and 9 are angle bars, this disposition of the transverse bars giving a greater strength than if they were placed otherwise.

Figure 3:
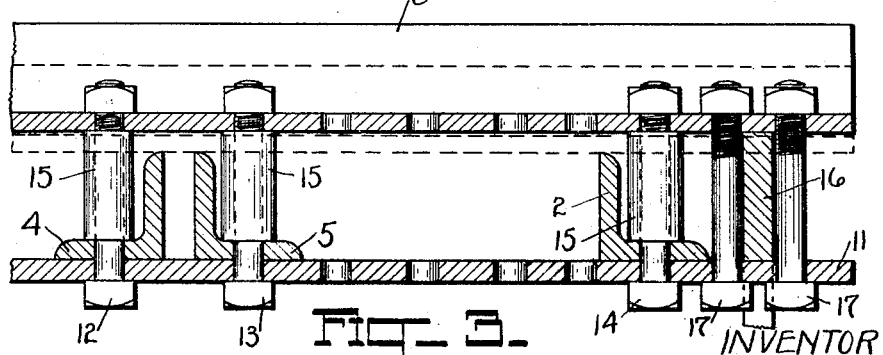
Figure 3 is an enlarged detail section on the line 3—3 of Figure 1.

The bolts 12, 13 and 14 in securing the bars of the structure together pass through the horizontal legs of the bars 1, 2, 4 and 5 and through tubular spacing members 15 interposed between the horizontal legs and the transverse bars 6, 7 and 8, as shown in Figure 3. The vertical legs of the bars 1, 2, 4 and 5 are short of contact with the transverse bars, as illustrated in Figure 3, to permit an adjustment to accommodate a smaller tool shank than the shanks 16 shown which are secured rigidly between the transverse bars and bolts 17. When it is desired to use tools having shanks the vertical depth of which is less than that of the shanks 16, I loosen the bolts and substitute shorter tubular members than shown, decreasing the vertical space between the transverse bars to accommodate shanks of varying vertical depth the limit of which is decided by contact of the transverse bars with the vertical legs of the angle bars, as illustrated by dotted lines in Figure 3, and after the change is made the bolts are again tightened to rigidly secure the parts together.

As before stated the forward under transverse bar 9 is an angle bar, and supported on the vertical leg thereof is an axle 18 on which are journaled wheels 19, said axle and wheels forming part of a power lift mechanism of a well known type. A hitch device 20 is attached to the clevis and to the rear of a tractor shown in fine lines.

In preparing soil for agricultural purposes the nature of the crop to be raised determines the depth to which the ground is to be worked and the compactness of the soil or its root condition to a great extent governs the selection of the kind of mechanism to be employed for effective work. My invention meets the demand for an implement particularly adapted for heavy work and is so constructed that various types of earth working tools can be mounted thereon such as the nature of the work to be done may require, and it is particularly adaptable for preparing ground for planting sugar cane and for the after deep cultivation thereof, and it is likewise valuable for trenching where the latter may be necessary.

It is obvious that the strain of the operation is such heavy work is borne by the frame supporting the earth working devices, consequently I have provided a frame of extraordinary strength and rigidity and well capable of withstanding any strain to which it may be subjected.

What I claim is—

1. In an implement of the type described, a frame including side bars parallel for part of their length and converging forwardly, a clevis to which the forward ends of said bars are secured, centrally arranged parallel bars having their forward ends bent downwardly and bolted to said clevis, transverse bars spaced apart and secured to the side and central bars, and earth working devices carried on the frame.

2. In an implement of the type described, a frame including side bars parallel for part of their length and converging forwardly, a clevis to which the forward ends of said bars are secured, centrally arranged parallel bars having their forward ends bent downwardly and secured to said clevis, transverse bars spaced apart and above the side and central bars, transverse bars spaced apart below the side and central bars in parallel relation with the transverse bars above the side and central bars, means securing said transverse bars to the side and central bars, and earth working devices carried by the frame.

3. In an implement of the type described, a frame including side bars parallel for part of their length and converging forwardly, a clevis to which the forward ends of said bars are secured, centrally arranged bars parallel with the parallel part of the side bars and with each other and having their forward ends bent downwardly and secured to said clevis below the connection of the side bars thereto, transverse bars spaced apart and above the side and central bars, transverse bars spaced apart below the side and central bars in parallel relation with the transverse bars above the side and central bars, means securing said transverse bars to the side and central bars and to each other, and earth working devices carried by the frame.

4. In an implement of the type described, a frame including side bars L-shaped in cross section, said side bars parallel for part of their length and converging forwardly, a clevis to which the forward ends of said bars are secured, central bars spaced apart parallel with the parallel part of the side bars and with each other, the forward ends of said central bars secured to said clevis below the connection of the side bars thereto, transverse bars spaced apart and above the side and central bars, transverse bars spaced apart below the side and central bars in parallel relation with the transverse bars above the side and central bars and with each other, means securing said transverse bars to the side and central bars and to each other, and earth working devices carried by the frame.

5. In an implement of the type described, a frame including L angle steel side bars parallel for part of their length and converging forwardly, a clevis to which the forward ends of said bars are secured, L angle steel bars arranged centrally between the side bars and spaced apart in parallelism with each other and with the parallel part of the side bars, said centrally arranged bars having their forward ends bent downwardly and secured to said clevis below the connection of the side bars thereto, rear and central L angle steel transverse bars and a forward flat transverse bar above the side and central bars, rear and central flat transverse bars below the side and central bars in parallel relation with the L angle bars above said side and central bars and with each other, an L angle steel transverse bar below the side and central bars and located forwardly in parallel relation with the flat bar above the side and central bars, means to rigidly secure the side and central bars and the transverse bars rigidly together, and earth working devices carried by the frame.

6. In an implement of the type described, a frame including side bars, a clevis to which the forward ends of said bars are secured, centrally arranged parallel bars secured to the clevis, transverse bars spaced apart and above the side and central bars, transverse bars spaced apart below the side and central bars in parallel relation with the transverse bars above the side and central bars, tool carrying means secured between said bars, bolts securing said side, central and transverse bars together, said bolts adapted to carry tubular members of varying length to increase or decrease the vertical distance between the upper and lower transverse bars to accommodate said means of different vertical thickness.

CARL G. STRANDLUND.